Aug. 16, 1966   P. F. SAPILEVSKY   3,266,117
DEVICE FOR THE REMOVAL OF CORE
LENGTHS FROM CHENILLE
Filed Sept. 5, 1963   6 Sheets-Sheet 1
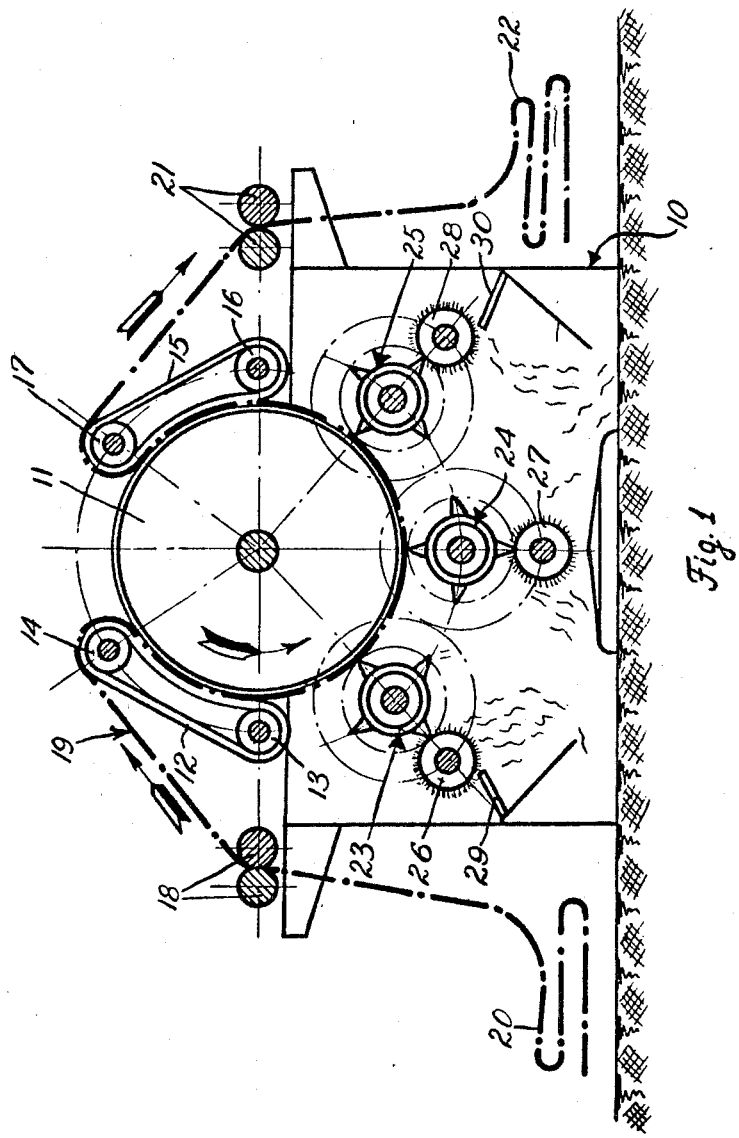
INVENTOR.
Piotr Filippovich Sapilevsky
BY

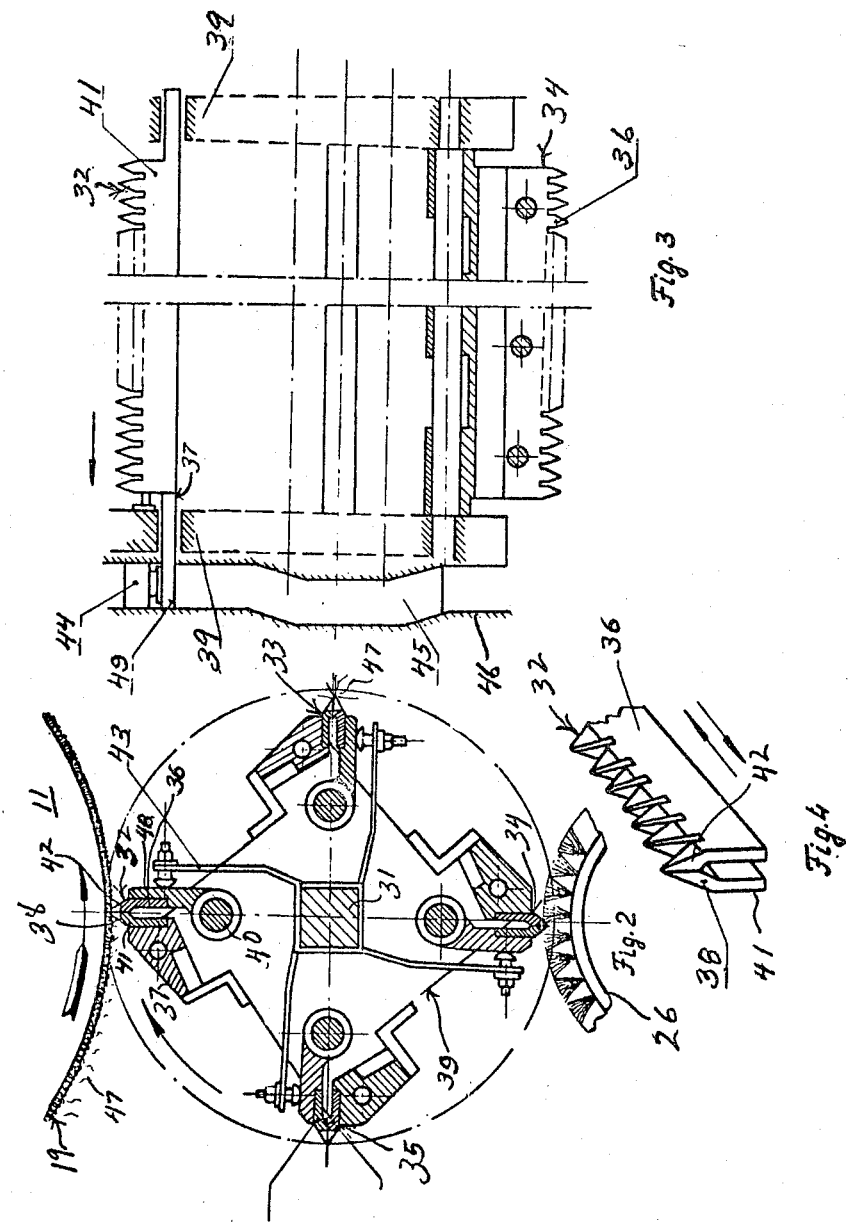

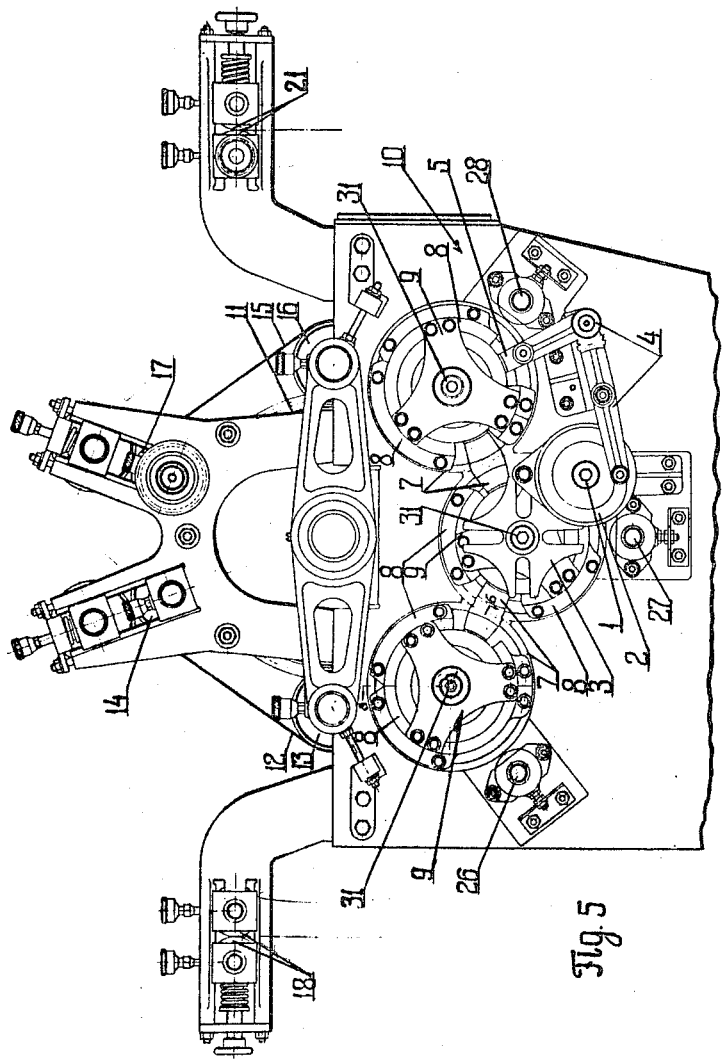

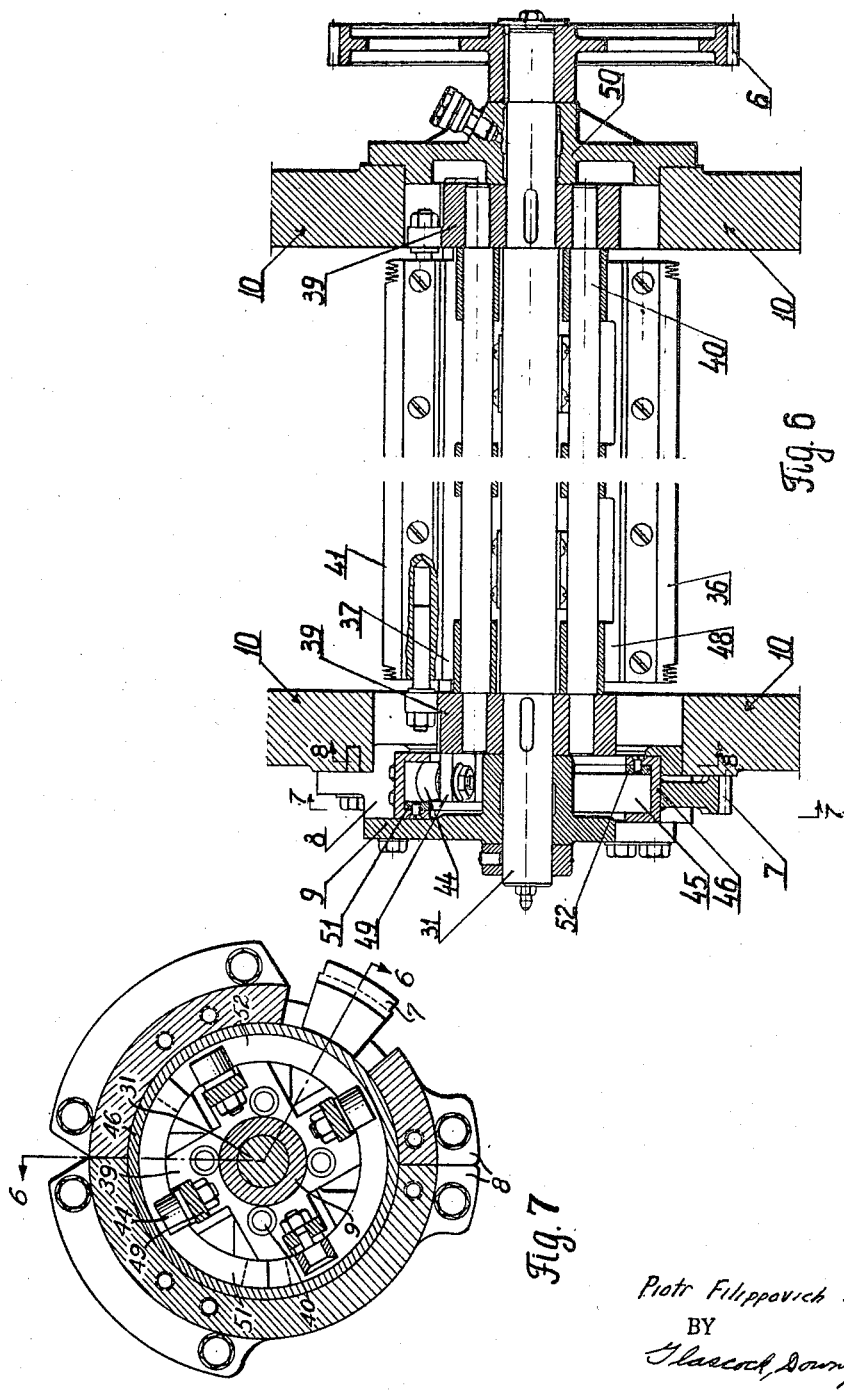

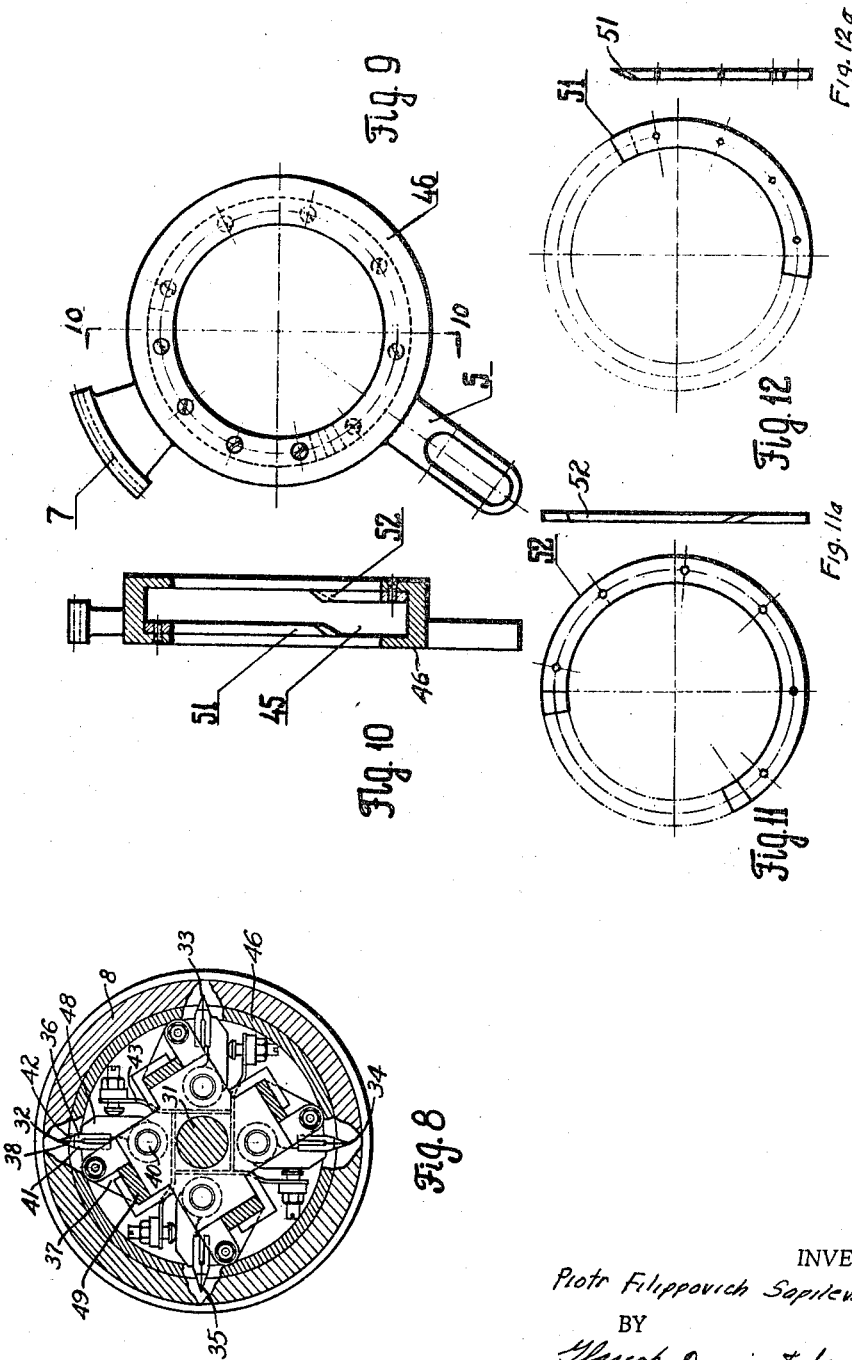

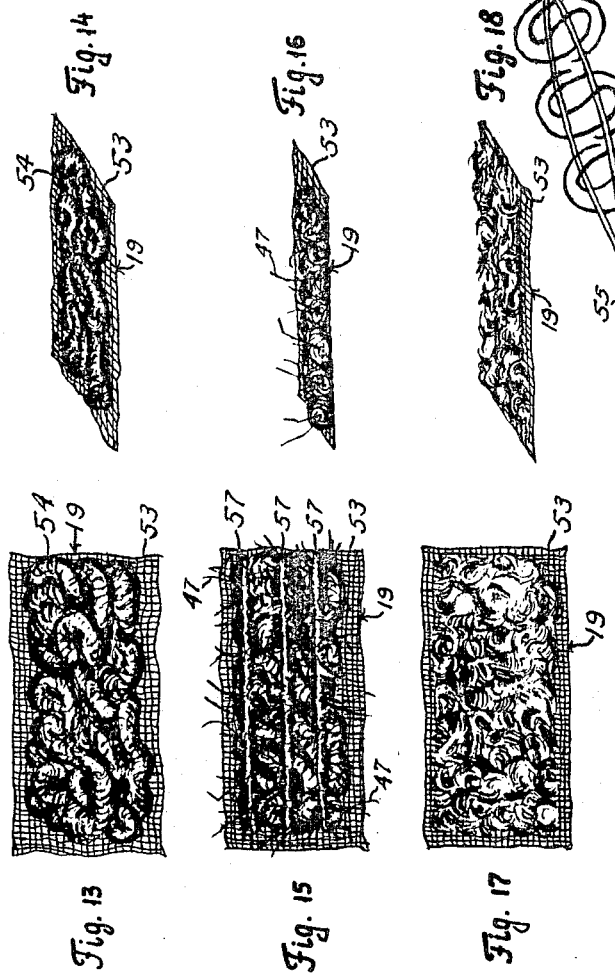

United States Patent Office 3,266,117
Patented August 16, 1966

3,266,117
DEVICE FOR THE REMOVAL OF CORE LENGTHS FROM CHENILLE
Piotr Filippovich Sapilevsky, U.S.S.R., assignor to Moscovsky Experimentalny Zavod iskoosstvennoi Kozhi e mekha, Moscow, U.S.S.R.
Filed Sept. 5, 1963, Ser. No. 306,908
5 Claims. (Cl. 26—2)

The invention relates to a device for the removal of cut core lengths from chenille in the process of manufacturing imitation persian lamb cloth, and this application is a continuation-in-part of my copending application, Serial No. 23,876, filed April 4, 1960 and now abandoned.

In a previously known process of manufacturing imitation fur from chenille, the chenille cores are untwisted prior to adhesively securing the chenille to a fabric backing, and thereafter, the cores are cut into separate lengths and removed by combing the fur. In previously known apparatus for manufacturing imitation fur from chenille, the core removing operation was performed manually, since no suitable mechanical means was available.

According to the present invention, the apparatus comprises two pairs of driven rolls for feeding and withdrawing a composite web comprising a fabric backing with chenille adhesively secured thereto and with the chenille cores cut into separate lengths. Disposed between the rolls is a rotatably mounted tension cylinder with two conveyor belts engaging a portion of the upper surface thereof on opposite sides of the cylinder axis. Below the tension cylinder and spaced around the lower periphery thereof are disposed three rotary combs which rotate simultaneously and intermittently. Adjacent each of the rotary combs there is provided a revolving comb cleaning brush.

The rotary combs each include several pairs of elongated axially disposed toothed comb sets. The sets of each pair are resiliently held in engagement throughout their length, and one set of each pair reciprocates axially with respect to the other set.

It is accordingly the primary object of the present invention to provide an apparatus for removing cut core lengths from chenille adhesively secured to a fabric backing in the manufacture of imitation persian lamb cloth.

A further object of the invention is the provision of a continuously operating apparatus for removing cut core lengths from chenille adhesively secured to a fabric backing in the manufacture of imitation persian lamb cloth, the apparatus including intermittently operating rotary combs engaging a continuously moving composite web of chenille and fabric backing.

Further objects and advantages of the invention will be apparent from the following descrpition taken in conjunction with the accompanying drawing, wherein:

FIG. 1 is a diagrammatic side view showing an apparatus constructed in accordance with this invention, as well as the manner of operation thereof;

FIG. 2 is a transverse sectional view showing the structure of one of the rotary combs;

FIG. 3 a diagrammatic view showing the mechanism for reciprocating certain of the toothed comb sets;

FIG. 4 a fragmentary view in perspective showing one pair of the toothed comb sets;

FIG. 5 a general side elevational view of the device;

FIG. 6 a longitudinal sectional view of a rotary comb taken on the line 6—6 of FIG. 5 and FIG. 7;

FIG. 7 a transverse sectional view of a rotary comb taken on the line 7—7 of FIG. 6;

FIG. 8 a transverse sectional view of a rotary comb taken on the line 8—8 of FIG. 6;

FIG. 9 an elevational view of an assembled actuating cam for the right rotary combs;

FIG. 10 a transverse sectional view of the cam taken on the line 10—10 of FIG. 9;

FIG. 11 a front elevational view of the large cover plate of the cam;

FIG. 11a a side elevational view of the cover plate of FIG. 11;

FIG. 12 a front elevational view of the small cover plate of the cam;

FIG. 12a a side elevational view of the cover plate of FIG. 12;

FIG. 13 a top plan view of the cloth with untwisted chenille secured to the backing;

FIG. 14 a view in perspective of the arrangement of FIG. 13;

FIG. 15 a top plan view of the cloth after the chenille cores have been cut into separate lengths, that is, prior to removal of the cut core lengths;

FIG. 16 a view in perspective of the arrangement of FIG. 15;

FIG. 17 a top plan view of the cloth after the removal of the chenille core lengths;

FIG. 18 a view in perspective of the arrangement of FIG. 17; and,

FIG. 19 an enlarged view in perspective of the separated core threads and fibers of the untwisted curled chenille.

With continued reference to the drawing there is shown an apparatus constructed in accordance with this invention and primarily intended for removing cut core lengths from chenille which has been adhesively secured to a fabric backing during the manufacture of imitation persian lamb cloth and such apparatus comprises a frame 10 upon which is rotatably mounted a horizontal tension cylinder 11. A portion of the upper peripheral surface of the cylinder 11 is engaged by a conveyor belt 12 which is trained over pulleys 13 and 14 and one of these pulleys may be driven to drive the belt 12. Another portion of the upper periphery of the cylinder 11 is engaged by a second conveyor belt 15 trained over pulleys 16 and 17 and one of these pulleys may be driven in order to drive the belt 15. In lieu of driving the belts 12 and 15, the cylinder 11 may be driven which will operate to drive the belts 12 and 15 by frictional engagement therewith, and either method of driving will operate satisfactorily.

A pair of driven feed rolls 18 engage a composite web 19 of chenille adhesively secured to a fabric backing and in which the core of the chenille has been cut into lengths and such web 19 may be fed from a suitable supply 20 thereof into engagement with the conveyor belt 12 and between such belt and the surface of the cylinder 11. The web 19 continues around the lower peripheral surface of the cylinder 11 and between the conveyor belt 15 on the upper surface of the cylinder 11 from which the web 19 passes between conveyor rolls 21 to a suitable storage location 22.

Rotatably mounted on the frame 10 below the axis of the cylinder 11 are three rotary combs 23, 24 and 25.

The rotary combs 23, 24 and 25 are intermittently rotated through an angular distance of ninety degrees by any suitable drive means, such as, for instance, a Geneva gearing. As will be seen from an inspection of FIG. 5, a cam 2 is mounted on the central drive shaft 1, and operates the Geneva gearing 3 mounted on the shaft of the rotary comb 24. The rotary combs 23 and 25 are operated by the gear wheels 6, arranged on each shaft of the three rotary combs.

As will be seen from an inspection of FIG. 1, the teeth of the combs 23, 24 and 25 engage the web 19 passing around the lower surface of the cylinder 11 in a manner and for a purpose to be presently described. Mounted on the frame 10 adjacent each rotary comb 23, 24 and 25 are rotary cleaning brushes 26, 27 and 28 which engage the combs 23, 24 and 25, respectively, to remove cut core lengths or other debris therefrom. Disposed adjacent the rotary brushes 26 and 28 are cleaning fingers 29 and 30 which engage the brushes 26 and 28, respectively, to clean the same and if desired, a similar cleaning finger may be provided for the rotary brush 27.

The rotary combs 23, 24 and 25 are identical in structure and consequently, only one of these combs will be described in detail, and it is to be understood that such a description will suffice for all. With particular reference to FIGS. 2, 3, 6, 7 and 8, the rotary comb 23 comprises a central shaft 31 on which are mounted angularly spaced pairs of toothed comb sets 32, 33, 34 and 35. The pairs of toothed comb sets are identical and the set 32 comprises an elongated toothed comb set 41 rigidly fixed to a bracket 37, which comb set can reciprocate axially along two guides 39 mounted on the shaft 31 and a second comb set 36 which is fixed to a bracket 48 that is pivotally mounted at 40 on the guides 39. The comb set 36 is urged by a spring or resilient means 43 mounted on the shaft 31 into engagement with the comb set 41. The comb set 41 is provided with radially projecting teeth 38 aligned with the teeth 42 of the comb set 36.

As shown in FIGS. 3 and 6, the bracket 37 with the comb set 41 of comb pair 32 fixed thereto is provided with an axially extending arm 49 on the outer end of which is mounted a cam roller 44, and such roller 44 is received in a cam track 45 of a suitable cam 46 which may be intermittently rotated in either direction in any desired manner.

With reference to FIGS. 5, 6, and 9, the cam 2 through the lever system 4 and shank 5 actuates the cam 46 of the rotary comb 25 to provide alternate rotary movement in opposite directions. The cam 46 of the rotary comb 25 transmits its movements to the cams 46 of the rotary combs 23 and 24 through the gear sectors 7, arranged on the cam of each rotary comb.

The cam 46 is a ring, the inside periphery of which has the curved closed track 45. The outside surface of the cam 46 serves to rotatably mount the cam in a circular opening of the frame 10 radially of the axis of the comb shaft 31 so that the cam embraces all extending arms 49 of the four movable comb sets 41 whereby the rollers 44 fixed on the arms 49 are received in the curved track 45, as shown in FIGS. 6 and 7.

The bearings of the cam 46 are fabricated as brasses in the shape of two half-rings 8 inserted in the circular opening of the frame (see FIGS. 5, 6 and 7). The half-rings 8 are rigidly connected with the bearing 9 of the shaft 31. The second bearing 50 of the shaft 31 is secured to the frame 10 proper.

For explaining the particular shape of the curved closed track 45, the drawings show two cover plates 51 and 52 (FIGURES 11 and 12), that are made as parts of flat rings of different lengths and are provided with end bevels. The plates 51 and 52 are fixed to opposite inner sides of the ring-shaped groove of the cam 46. A suitable combination of ring surfaces and bevels produce the required curved closed cam track 45 (see FIGURES 3 and 10).

Operated by the driving means, the cam 46 may rotate about the comb shaft 31 through a desired angle, such operation taking place at the moment when the shaft and combs carried thereby has completed a turn through ninety degrees, as the result of operation of the Geneva gearing, and when one of the four comb pairs is in the position shown at the top of FIG. 2, i.e. when the teeth are in engagement with the composite web. During the interval which follows until the comb shaft 31 turns again, the cam 46 previously at rest is operated by the driving means to move in one direction through a certain angle sufficient to move the cam roller 44 to the portion of the curved cam track 45 which insures instantaneous grasping of cut core lengths between the teeth of the comb sets 36 and 41 and retention in this position through further rotation of the comb shaft 31 before the pair of comb sets moves into engagement with the associated cleaning brush. After rotation in the direction mentioned above, the cam returns to the initial position, this return movement being completed before the comb shaft 31 has completed the following ninety degree turn. When the comb pair approaches the associated cleaning brush, the cam roller 44 moves along the cam track 45, which is at rest, to the portion which insures opposite movement of the movable comb set 41, and thereby releases cut core lengths from between the teeth.

Consequently, it will be seen that movement of the cam 46 with respect to the cam roller 44 and movement of the cam roller 44 with respect to the cam 46 causes the comb set 41 to reciprocate with respect to the comb set 36 to an extent depending upon the characteristics of the cam track 45.

With the shaft 31 and comb sets carried thereby fixed, the cam 46 moves in the opposite direction through a small angle (20–30°) and subsequently the shaft 31 and comb sets carried thereby as well as the cam 46 rotate in the other direction, the shaft through an angle of ninety degrees and the cam through an angle of 20–25 degrees. When the shaft stops, the cam moves again in the opposite direction, and this sequence of operation takes place for each ninety degree movement of the shaft 31 and the comb sets carried thereby It is to be noted that the rotation of the cam 46 together with the shaft 31 may start either simultaneously with the rotation of the shaft 31 or within a short interval thereof, such rotation being completed upon movement of the shaft 31 through about three-fourths of its ninety degree movement.

Thus, at the time taken the rotary comb 23 moves through ninety degrees in one direction, the cam 46 moves only through 20–25 degrees in the one and then in the other direction.

When the rotary comb with a plurality of comb pairs carried thereby has stopped (following a ninety degree movement of the rotary comb), with the teeth of comb pair 32 in engagement with web 19, cam 46 moves contrary to the rotary comb movement, roller 44 of comb set 41 moves in the curved portion of cam track 45 and comb set 41 moves respective comb set 36, thereby actuating the teeth of those comb sets to instantaneously grasp core lengths 47 between the teeth of the comb sets.

A subsequent ninety degree rotation of the rotary comb and the movement of comb pair 32 to the position of comb pair 33 does not change the alignment of comb sets 41 and 36, and lengths 47 remain grasped by the teeth of those comb sets (FIG. 2). At the moment when the rotary comb again stops, cam 45, which prior to stoppage thereof has returned to the original position, performs the first movement again thereby moving the comb sets of the next comb pair 35 that has moved (responsive to the rotary comb movement) to the position previously held by comb pair 32. Hence, core lengths are again grasped by the teeth of comb pair 35.

For the next ninety degree movement of the rotary comb when comb pair 32 moves to the position of comb pair 34 close to the brush 26 due to the movement of roller 44 of comb set 41 in the curved portion of cam track 45, the comb set 41 reciprocates as the rotary comb approaches the brush, and, as a result, core lengths 47 grasped by the teeth are released thereby enabling the brush 26 to remove these lengths from the teeth of comb pairs 36 and 41.

Upon further movement of the comb pair 32 through another one hundred eighty degrees roller 44 does not encounter curved portions in the second semi-circle of cam track 45 and, therefore, does not actuate set 41 of comb pair 32 until the pair has returned to the initial position illustrated in FIG. 2, i.e., when the teeth of comb pair 36, 41 have again come into engagement with the chenille.

With reference to FIGS. 13 and 14, there is shown a fabric backing 53 with a mass of untwisted chenille 54 adhesively secured thereto to provide a composite web 19. FIG. 19 is an enlarged view showing the core threads 55 and the fibers 56 of the chenille prior to securing the same to the fabric backing 53.

The composite web 19 passes through a suitable cutting apparatus, not shown, in which rotary knives cut the core threads 55 along lines 57 leaving some projecting core lengths 47, as shown in FIGS. 15 and 16.

Thereafter, the composite web 19 with the projecting core lengths 47 passes through the apparatus of this invention to remove the core lengths 47 after which the material is combed in any suitable manner to remove any loose fibers and provide a finished imitation persian lamb cloth having a fluffy appearance, as shown in FIGS. 17 and 18.

It will be obvious that by the above described invention there has been provided a relatively simple, yet highly effective apparatus for automatically removing cut core lengths from chenille adhesively secured to a fabric backing during the manufacture of imitation persian lamb cloth, and the apparatus of this invention may be operated continuously in order to provide a high rate of production. The apparatus is also self-cleaning, thereby requiring a minimum of attention and maintenance.

It will be obvious to those skilled in the art that various changes may be made in the invention, without departing from the spirit and scope thereof, and therefore the invention is not limited by that which is shown in the drawings and described in the specification, but only as indicated in the appended claims.

What is claimed is:

1. An apparatus for removing cut core lengths from chenille adhesively secured to a fabric backing in the manufacture of imitation persian lamb cloth, said apparatus comprising means for feeding a composite web of chenille and fabric backing, a horizontally disposed rotatably mounted cylinder, driven conveyor belts engaging a portion of the upper surface of said cylinder on opposite sides of the cylinder axis, said web passing between said belts and said cylinder and engaging the lower peripheral surface of said cylinder, a plurality of intermittently driven rotary combs spaced around the lower peripheral surface of said cylinder, each comb including a plurality of angularly spaced pairs of toothed comb sets and means for intermittently engaging the teeth of each pair of comb sets with the chenille of said web to remove cut core lengths therefrom and a rotary cleaning brush engaging each rotary comb to remove core lengths therefrom.

2. An apparatus as defined in claim 1, in which each pair of toothed comb sets of each rotary comb comprises a first elongated set of radially projecting teeth disposed axially of said rotary comb and mounted for pivotal movement, a second co-extensive set of radially projecting teeth engaging said first set and reciprocable axially thereof, resilient means to hold the first set in engagement with said second set, said means for intermittently engaging the teeth of each pair of comb sets with the chenille comprising an arm projecting axially from said second set, a cam roller on said arm and a cam with a closed curved track for each rotary comb engaging the roller of the second set of each pair of toothed comb sets, whereby operation of said cam moves the second set of the pair of comb sets in engagement with the web in one direction to grasp cut core lengths between the teeth of the first and second sets thereof to pull the same from said web and whereby upon rotation of said rotary comb toward the rotary brush, the second set of the comb pair is moved in the opposite direction to release core lengths held thereby for removal by said brush.

3. An apparatus as defined in claim 1, in which each pair of toothed comb sets of each rotary comb comprises a first elongated set of radially projecting teeth disposed axially of said rotary comb and mounted for pivotal movement, a second co-extensive set of radially projecting teeth engaging said first set and reciprocable axially thereof, resilient means holding the first set in engagement with said second set, said means for intermittently engaging the teeth of each pair of comb sets with the chenille comprising means to reciprocate each said second set, whereby upon movement of said second set of the pair of comb sets in engagement with the web in one direction cut core lengths will be grasped between the teeth of said first and second comb sets thereof to pull the same from said web and whereby upon movement of the second set of the pair of comb sets in the opposite direction, said cut core lengths held thereby will be released for removal by said rotary brush.

4. An apparatus as defined in claim 1, in which each pair of toothed comb sets of each rotary comb comprises a first elongated set of radially projecting teeth disposed axially of said rotary comb and fixed thereto, a second co-extensive set of radially projecting teeth engaging said first set and reciprocable axially thereof, a guide mounted on said rotary comb and engaging said second set, said means for intermittently engaging the teeth of each pair of comb sets with the chenille comprising means to reciprocate the guide of each said second set, whereby upon movement of the second set of the pair of comb sets in engagement with the web in one direction cut core lengths will be grasped between the teeth of said first and second sets thereof to pull the same from said web and upon movement of the second set of the pair of comb sets in the opposite direction core lengths held thereby will be released for removal by said rotary brush.

5. An apparatus as defined in claim 1, in which means are provided for engaging and cleaning at least some of said rotary brushes.

References Cited by the Examiner

UNITED STATES PATENTS 2,922,214   1/1960   Gilbreath _____ 26—2
3,138,844   6/1964   Levine _____ 26—2

ROBERT R. MACKEY, *Primary Examiner.*

DONALD W. PARKER, *Examiner.*